April 13, 1954
G. L. OLSON
2,675,242
FLOATING HOLDER FOR TOOLS
Filed Jan. 10, 1951
3 Sheets-Sheet 1
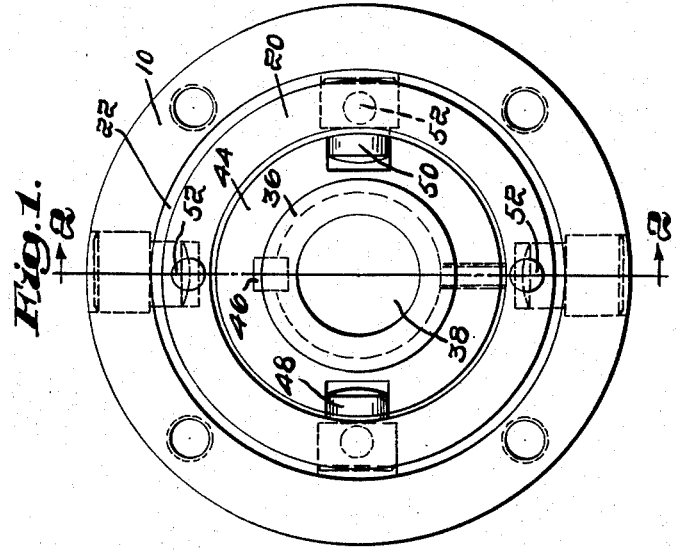
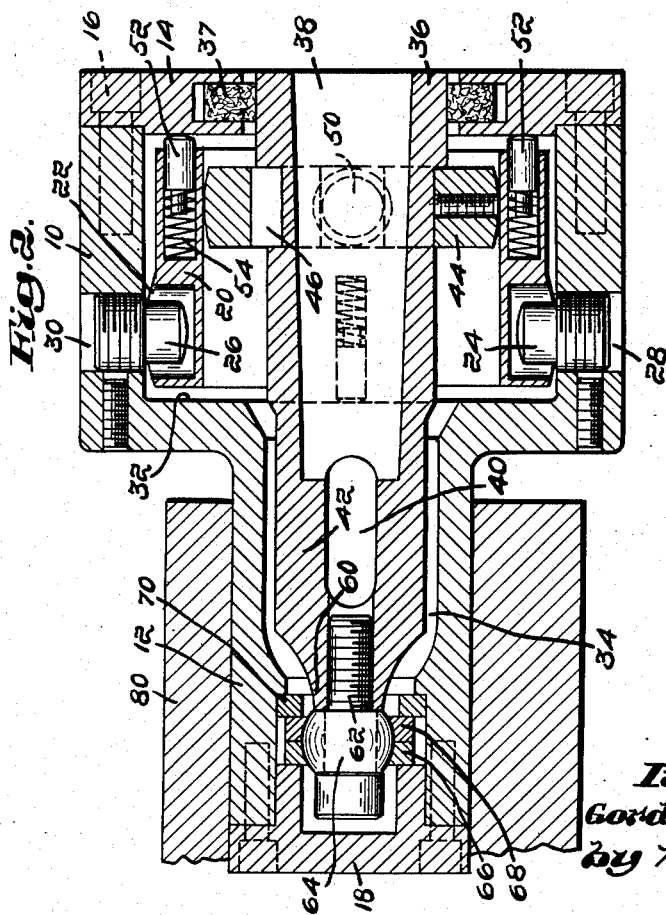
Inventor:
Gordon L. Olson,
by Thomas W. Hamilton
Attorney April 13, 1954
G. L. OLSON
2,675,242
FLOATING HOLDER FOR TOOLS
Filed Jan. 10, 1951
3 Sheets—Sheet 2
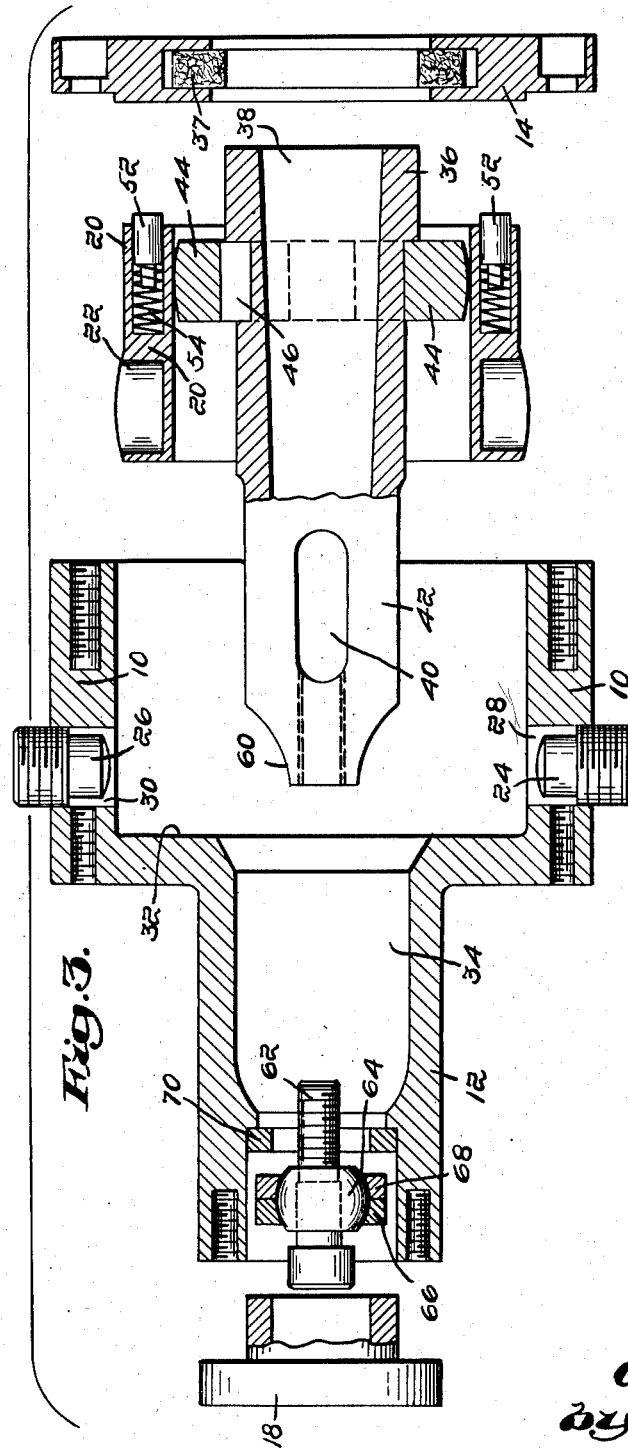
Inventor:
Gordon L. Olson,
by Minor W. Hamilton
Attorney April 13, 1954  G. L. OLSON  2,675,242
FLOATING HOLDER FOR TOOLS
Filed Jan. 10, 1951  3 Sheets-Sheet 3
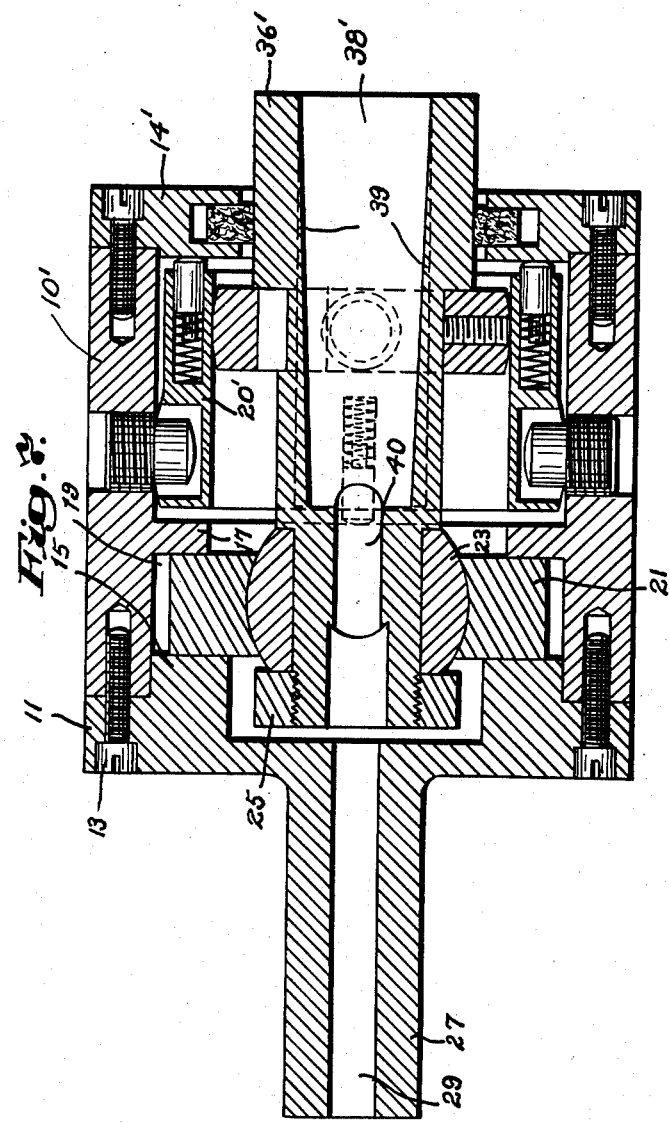
Inventor:
Gordon L. Olson,
by  Thomas W. Hamilton
Attorney Patented Apr. 13, 1954

2,675,242

UNITED STATES PATENT OFFICE 2,675,242

FLOATING HOLDER FOR TOOLS

Gordon L. Olson, Arlington, Mass.

Application January 10, 1951, Serial No. 205,266

17 Claims. (Cl. 279—16)

This invention relates to an improved tool of the type commonly referred to as a "floating holder" in which a reamer or other similarly driven member may be supported for engagement with a work piece having a bore formed therein and with respect to which it may be desired to locate the reamer in proper axial alignment.

In conventional forms of floating holders it is customary to employ gear spline couplings to compensate for misalignment between the axes of the reamer and the bore in which it is to operate. Devices constructed in this way are subject to various objections in that they do not always permit equalized freedom of float in all directions and there may develop jamming of the gears and cramping of the reamer in the work tending to produce breakage. The gear spline type of structure referred to is also expensive to manufacture and maintain in operation.

The present invention is concerned with the problems indicated and aims to provide an improved floating holder, and to devise a tool supporting member which is of simple construction, resulting in a substantial reduction in manufacturing costs, which is free from operational difficulties, and which insures uniform freedom of float in all directions. Another object of the invention is to provide an improved tool holder which is easily installed and operated; which is capable of being utilized in connection with various types of rotary driving operations; and which is characterized by long wearing life.

These and other objects and novel features will be more fully understood and appreciated from the following description of a preferred embodiment of the invention selected for purposes of illustration and shown in the accompanying drawings, in which Fig. 1 is an end elevational view of the floating holder of the invention;

Fig. 2 is a central, vertical cross-section taken on the line 2—2 of Fig. 1;

Fig. 3 is an exploded view showing in cross-section the several parts of the holder separated from one another;

Fig. 4 is an end elevational view of the centering sleeve;

Fig. 5 is a detail view of the slotted joint means;

Fig. 6 is a fragmentary, sectional view showing a modified form of collet supporting mechanism; and Fig. 7 is a sectional view of a modification.

In the structure shown in the drawings, numeral 10 refers to an outer casing comprising a hollow cylindrical shell which is formed with a reduced end section. The forward end of the casing, as viewed at the right-hand side of Fig. 2, is normally closed by a cover 14 removably secured to annular edges of the casing by means of bolts 16. A second cover 18 is similarly secured at the reduced end section 12, as shown in Fig. 2. These parts, as well as others hereinafter described, are shown in separated relation in Fig. 3.

Located in the casing 10 is a drive member or centering sleeve 20 which is of cylindrical shape and constructed with a diameter substantially less than the inner diameter of the casing 10 so that the centering sleeve is normally spaced away from the casing throughout a part of its length. At one end of the sleeve 20 is further provided a ball joint 22 which extends annularly around the sleeve between this member and the inner peripheral surface of the casing 10, in the manner suggested in Fig. 2. The joint 22 is preferably constructed as an integral part of the sleeve, as shown.

Transversely disposed through two opposite sides of the ball joint 22 are pins or studs 24 and 26 which are adjustably threaded into openings 28 and 30 (Fig. 5) respectively, formed through the sides of the casing 10. The pins 24 and 26 function to pivotally secure the centering sleeve in a position such that its inner edge lies in spaced relation to the bottom surface 32 of the casing. The sleeve when thus supported may be swivelled about in the casing on the pin members and is free to pivot in all directions, being only limited by the surrounding peripheral surface of the casing 10.

Extending axially through the centering sleeve 20 and into the bore 34 of the reduced end section 12 of the casing is a floating chuck or collet 36 which is formed with a tapered opening 38 of some conventional type, such as a Morse taper, in which a reamer or other tool may be received. Such a tool may be removed by means of a knockout slot 40 constructed in a shank portion 42 of the collet which, as shown in Fig. 2, is of a diameter substantially smaller than the diameter of the bore 34. A fibrous collar 37 is recessed in the cover 14 and encircles the collet end, as shown in Fig. 2.

Around its outer peripheral surface the collet 36 is provided with another ball joint member 44 which may conveniently take the form of a ring member having crowned outer surfaces secured against a shouldered portion of the collet by means of a key 46, as shown in Fig. 2. The ball joint member 44 measured at its greatest diameter is of substantially the same size as the inner diameter of the centering sleeve and hence lightly bears against this member and is further pivotally secured to the sleeve by means of two pins 48 and 50 which extend through the ball joint from two opposite sides, as is more clearly shown in Fig. 1.

The pins 48 and 50 are located near the outer end of the collet and it will be seen that they occur in spaced relation to the pins 24 and 26 and extend at right angles thereto, being threaded through openings formed in two opposite sides of the centering sleeve 20. It will thus be seen that the collet is free to swivel in the centering sleeve for all positions which the latter member may assume as it, in turn, swivels or pivots about on its respective ball joint 22.

In order to normally maintain the centering sleeve and the collet in coaxial relationship with respect to the casing, I may also provide spring means comprising, for example, a number of spring-held equalizing plungers 52 which are resiliently forced by coiled springs 54 against two opposite surfaces at four separate points which are equally spaced apart around the casing. As will be noted in the drawings, two of the plungers bear against the cover 14, while the other two plungers, arranged at 90° to the first two, bear against the surface 32. The effect of these plungers is to yieldably maintain the collet and sleeve in a squarely disposed position into which these members seek to return, when free to do so, from any position of displacement.

The shank end 42 of the collet 36 is formed with a tapering tool piece 60 which is internally threaded to receive a bolt member 62 on which is mounted a ball and socket including a ball element 64 and a sectional socket including a pair of ring members 66 and 68 which have inner concaved surfaces complementary with the ball element 64. The ring members 66 and 68 bear against the collar 70, in turn resting against a shouldered portion of the end section 12, as noted in Fig. 2. The inner annular edges of the cover 18 hold the ring members 66 and 68 with a very light pressure so that these members are free to slide in all directions in the space included between the collar 70 and the cover 18. At the same time the ball and socket allows the tail piece to pivot into various positions in response to changes in the location of the outer end of the collet.

In using the device described, a tool as, for example a reamer, is inserted in the tapered portion of the collet 36, and the casing 10 is then mounted in whatever type of machine may be desired to be used. For example, in Fig. 2 of the drawings there has been illustrated a turret head 80 in which the reduced end section 12 of the casing may be secured in some conventional manner. It is pointed out that in this particular type of operation the floating holder does not turn but is held in a stationary position and a work piece having a bore formed therein is rotated with the reamer being inserted in the bore.

Assuming that misalignment occurs between the axis of the bore in the work piece and the axis of the reamer, the function of the floating holder is to make a correction and this is done in the following manner:

As the end of the reamer enters the bore in the work piece, the axis of the reamer will, at first, extend in a somewhat angular direction. In assuming this position, the centering sleeve 20 will be swivelled a small distance toward one side of the casing 10. This is accompanied by simultaneously moving the collet which pivots on its ball joint and moves laterally toward the casing. Further engagement of the work piece with the reamer, however, acts to straighten the reamer and continue lateral movement of the collet with respect to the casing. It will be seen, therefore, that in response to the force or thrust sideways of the work piece on the reamer end, the collet is caused to pivot on its ball joint 44 while the centering sleeve is resiliently held in the inclined position described. The collet then completes alignment of its axis with the axis of the work piece.

As this adjustment of the collet takes place, it will be observed that the spring-held plungers on one side or the other of the centering sleeve are forced inwardly a short distance to permit the adjustment to take place and, at the same time, the shank of the collet will pivot at its ball and socket portion and concurrently with the position of parallelism being assumed, the ring element 66 and 68 will slide in the guideway to facilitate the alignment movement. It will be observed that this cooperative movement of the tail piece of the collet is very important in allowing a smooth, freely acting float of the collet to take place without throwing any strain on any of the working parts of the holder and without developing any tendency for the reamer to jam in the work and cause breakage. Since the tail piece adjustment is very lightly held, it is free to return with the rest of the collet member to a starting position in response to the centering tendency of the spring-held plungers.

When the tooling operation is completed and the reamer is withdrawn, the springs will immediately return the centering sleeve and collet to a squared position in which the axes of these two members will coincide with the axis of the casing 10. There is thus achieved a simple, positive, and efficient floating of the collet member which effectually prevents misalignment and jamming or breaking of the tool and constantly assures that the reaming action carried out within the bore of the work piece will be sure and uniform in character throughout the length of the opening.

It is intended that various changes may be resorted to in constructing the holder of the invention. Thus I may, in connection with supporting the tail piece of the collet, employ a ball and socket arrangement of the character shown in Fig. 6 and I may further include thrust bearings 84 inserted between the cover 18 and the collar 70 to further facilitate movement of the tail piece in this space.

Still another desirable form which the invention may take has been illustrated in Fig. 7 in which a casing 10' has a cover 14' in which is received a sleeve member 20' provided with the same dual ball joint construction already described in connection with Figs. 1 to 6, inclusive, with two changes which will now be described.

One of these changes involves construction of the opposite end of the casing 10' with a removable cover section 11 secured by bolts 13 and formed with a reduced inner extremity 15, as shown. The inner periphery of the casing is also formed with an annular rim or flange 17 occurring in spaced relation to the reduced end 15 to provide a guideway 19 in which is slidably received a slide member 21. This slide member is preferably made in sections and is secured about a ball member 23 to provide a socket for the latter member. This ball member 23 is adjustably secured on the inner extremity of a collet member 36' by means of a threaded member 25. The bore in the collet member 36' may be a tapered bore 38', as shown in full lines, or there may also be employed a straight-sided bore, such as has been suggested somewhat diagrammatically by means of the dotted lines 39 shown in the drawings. It will also be observed that the bore extending through the collet 36' has been continued and extends all the way through the entire holder structure including a shank end 27 extending rearwardly from the member 11.

The above described construction has several advantages for some types of applications. For example, the use of a removable cap or head 11 at the opposite end of the holder from the collet aperture makes it possible to construct the shank portion 27 of this member in varying sizes so that one tool can be made to fit into different size apertures by merely changing the cap or head 11, where a suitable range of sizes of these members have been provided. The operation of the floating holder is the same as has already been described with the type of tail piece shown in Figs. 1 and 2.

Another advantage which may be realized is that by having the tool bore extending all the way through the holder and its shank head, it is possible to use straight-sided tools and drift out or dislodge such tools by inserting a plunger member through the bore 29 of the shank 27 when desired. At the same time the tapered type of tool shank can be drifted out in the usual manner by driving a wedge into the opening 46' in the manner already described.

It should be understood that in any one of the several forms of the invention now described, other changes may be resorted to, such as reversing the position of the ball joints on their respective members, and utilizing other types of resilient centering means.

It is further pointed out that while the invention has been above described with particular reference to a reaming operation it is, nevertheless, contemplated that the floating holder may be satisfactorily employed in connection with drilling, tapping and other rotary type operations. It should also be understood that the tool may function as a floating holder equally as well when employed in connection with a work piece which is held stationary while the tool itself is driven, in which event the action of the collet will be to continuously rotate about a moving axis which travels in a circular path about the axis of the outer casing.

These and other changes and variations in the manner of constructing and applying the floating holder are intended within the scope of the claims appended hereto.

I claim:

1. A device of the class described, comprising a casing, a holder element therein, said holder element presenting a tapered tool receptacle, a tubular driver element interposed between the casing and holder element, and ball joint means for pivotally securing the driver element to both the casing and the holder element at two spaced-apart points to provide for lateral movement of the holder element relative to the casing with its axis in parallel relation to the axis of the casing.

2. A device of the class described, comprising a casing, a holder element therein, said holder element presenting a tapered tool receptacle, a tubular driver member interposed between the casing and the holder element, and pin and ball joint means for pivotally securing the driver element to both the casing and the holder element at two spaced-apart points to adjustably support the holder element so that its axis of rotation may be maintained in parallel relation to the axis of the casing as the holder element moves toward and away from the casing into positions of alignment with a work piece.

3. In a floating holder for freely supporting a tool so that the tool may engage the bore of a work piece in an axially aligned position, the combination with a hollow casing, of a collet member located therein, a driver member interposed between the casing and collet member, and pin and ball joint means for swivelling the driver on both the casing and holder element at two spaced-apart points so that the collet member may move toward the casing into varying positions of adjustment, in any one of which positions the axis of rotation of the collet lies in parallel relation to the axis of the casing.

4. A structure as defined in claim 3, in which the means for swivelling the driver member includes a ball joint extending annularly between the casing and the driver member, and pin means located transversely through two opposite sides of the ball joint.

5. A structure as defined in claim 4, in which the ball joint is integral with an outer peripheral surface of the driver member and the said pins are adjustably secured in the casing.

6. A structure as defined in claim 3, in which the means for swivelling the driver includes a ball joint extending annularly between the driver and the collet member, and pin means transversely disposed through two opposite sides of the said ball joint.

7. A structure as defined in claim 3, in which the means for swivelling the driver includes a ball joint extending between the driver and the inner periphery of the casing, pin means transversely disposed throughout the said ball joint, a second ball joint extending between the collet and the inner periphery of the driver, said second ball joint lying in spaced relation to the said first ball joint, and pin means transversely disposed through said second ball joint at right angles to the pin means of the said first ball joint.

8. An improved self-aligning holder for supporting and engaging a tool in a work piece having a bore formed therein, said holder comprising, in combination, an outer casing, a driving member having one end swivelled in the casing, a collet adjustably secured to the driving member and cooperating therewith to locate the tool in axial alignment with the said bore said collet being secured by spaced-apart ball joint means occurring both externally and internally of the driving member and spring means normally operative to maintain the collet and driving member in coaxial relation.

9. An improved floating holder of the class described comprising a casing formed with a hollow reduced end section, a centering sleeve loosely disposed in the casing, ball joint means arranged between the centering sleeve and casing, pin elements cooperating with the ball joint means to pivotally secure the sleeve in the casing, a collet member received in the centering sleeve in spaced relation thereto, ball joint means extending annularly between the sleeve and collet, pin means for pivotally securing the collet in the sleeve, and means for slidably supporting the shank of said collet in the reduced end of the casing.

10. A structure as defined in claim 8, in which the spring means comprise a plurality of equalizing spring-held plungers received in the driving member in a position to bear against two opposite walls of the casing.

11. An improved floating holder of the class described, comprising a casing formed with a hollow reduced end section, a centering sleeve loosely disposed in the casing, ball joint means arranged between the centering sleeve and casing, pin elements cooperating with the ball joint means to pivotally secure the sleeve in the casing, a collet member received in the centering sleeve in spaced relation thereto, ball joint means extending annularly between the sleeve and collet, pin means for pivotally securing the collet in the sleeve, and means for slidably supporting the shank of said collet in the reduced end of the casing, the collet member presenting a reduced shank portion, and ball socket means for slidably guiding the collet shank in adjacent portions of the said casing.

12. An improved floating holder for supporting and engaging a tool in a work piece having a bore formed therein, said holder comprising a casing constructed with a hollow reduced end section, a centering sleeve having one end swivelled on a ball joint in the casing, a collet member pivotally secured by a ball joint pinned in the centering sleeve and cooperating therewith to move the said tool in a lateral direction relatively to the casing in order to locate the tool in axial alignment with the said bore, said collet having a shank portion extending rearwardly into the reduced end section of the casing in spaced relation thereto, ball socket means including a ball fixed to the said shank portion of the collet member, and means for slidably receiving the ball socket and guiding it toward and away from the reduced end section during lateral movement of the collet.

13. A structure as defined in claim 12, in which the means for slidably supporting the ball socket includes a retainer ring adapted to have supported thereagainst one side of the said ball socket, an annular cap detachably secured to the reduced end section of the casing, said cap presenting annular edges extending inwardly into spaced relation to the retainer ring to bear against the opposite side of the ball socket.

14. An improved floating holder for supporting and engaging a tool in a work piece having a bore formed therein, said holder comprising an outer cylindrical casing, a cover detachably secured to the casing, one end of the casing being formed with a hollow reduced end section, a centering sleeve having one end swivelled in the casing on a ball joint, a collet member secured by means of a ball joint within the centering sleeve and cooperating with the sleeve to move the said tool in a lateral direction in order to locate the tool in axial alignment with the said bore, said collet member presenting a shank portion extending rearwardly into the said reduced end section of the casing, means for slidably supporting the shank of the collet for lateral movement when the forward portion of the collet member changes its position, and spring means located in the centering sleeve including spring-held plungers, said spring means being operative to urge the casing and collet member into a normal position of co-axial relation with respect to the said outer casing.

15. A structure as defined in claim 1, in which the casing is formed with a removable cap, said cap being constructed with a reduced shank portion.

16. A structure as defined in claim 15, in which the reduced shank is formed with a bore which extends inwardly and communicates with an opening in the holder element.

17. A device as described in claim 15, including a slide member movably supported between the cap and the casing, said slide comprising a ball socket, a ball member adjustably received on the holder element and mounted to swivel in the ball socket.

References Cited in the file of this patent
UNITED STATES PATENTS

| Number | Name | Date |
|---|---|---|
| 1,180,234 | Bruner | Apr. 18, 1916 |
| 1,357,843 | Cashman | Nov. 2, 1920 |
| 1,377,663 | Brown et al. | May 10, 1921 |
| 2,475,385 | Frisco | July 5, 1949 |
| 2,498,148 | Berritta | Feb. 21, 1950 |
| 2,508,459 | Hoffsommer | May 23, 1950 |
| 2,525,646 | Burg | Oct. 10, 1950 |